US006761348B2

(12) United States Patent
Michels et al.

(10) Patent No.: US 6,761,348 B2
(45) Date of Patent: Jul. 13, 2004

(54) THROTTLE DEVICES HOUSING WITH FLEXIBLE COMPENSATION ELEMENTS FOR INTERNAL COMBUSTION ENGINES

(75) Inventors: Markus Michels, Stuttgart (DE); Stefan Josten, Remscheid (DE)

(73) Assignee: Robert Bosch GmbH, Stuttgart (DE)

(*) Notice: Subject to any disclaimer, the term of this patent is extended or adjusted under 35 U.S.C. 154(b) by 152 days.

(21) Appl. No.: 10/214,159

(22) Filed: Aug. 8, 2002

(65) Prior Publication Data

US 2003/0030022 A1 Feb. 13, 2003

(30) Foreign Application Priority Data

Aug. 8, 2001 (DE) ........................................ 101 38 931

(51) Int. Cl.[7] ................................................ F16K 1/226

(52) U.S. Cl. ....................................... 251/305; 251/307

(58) Field of Search ................................. 251/305–308

(56) References Cited

U.S. PATENT DOCUMENTS

| | | | | |
|---|---|---|---|---|
| 3,986,699 A | * | 10/1976 | Wucik et al. | 251/173 |
| 4,348,006 A | * | 9/1982 | Schmitt et al. | 251/288 |
| 5,876,015 A | * | 3/1999 | Schaeffer et al. | 251/305 |
| 6,427,975 B1 | * | 8/2002 | Powell | 251/305 |

FOREIGN PATENT DOCUMENTS

| | | |
|---|---|---|
| DE | 26 43 996 A1 | 4/1977 |
| DE | 29 49 041 B1 | 6/1981 |
| DE | 33 46 167 A1 | 7/1985 |
| DE | 42 02 437 A1 | 7/1992 |
| DE | 43 10 901 A1 | 10/1994 |
| DE | 43 29 522 A1 | 3/1995 |
| DE | 44 01 690 A1 | 7/1995 |
| DE | 195 25 510 A1 | 1/1997 |
| DE | 199 15 695 A1 | 10/1999 |
| DE | 198 43 771 A1 | 3/2000 |
| DE | 199 36 457 A1 | 2/2001 |
| DE | 101 14 994 A1 | 10/2001 |
| DE | 101 14 221 A1 | 10/2002 |
| EP | 1 083 317 A2 | 3/2001 |
| EP | 1 083 317 A3 | 3/2001 |
| JP | 2002-297661 | 11/2002 |
| WO | WO 95/02493 | 1/1995 |

* cited by examiner

*Primary Examiner*—Paul J. Hirsch
(74) *Attorney, Agent, or Firm*—Ronald E. Greigg

(57) ABSTRACT

The invention relates to a throttle device for controlling a fluid flow in an internal combustion engine, with a multi-part housing, whose first housing part and whose additional housing half rest against each other at contact surfaces and the fluid flow is controlled by means of a flat valve element, which can be adjusted in the flow conduit of the fluid flow by an actuating drive. The throttle device contains at least one sealing and compensation element, whose shaping of its inner wall defines the flow cross section of the fluid flow in the throttle device and which has a contact surface, which can seal cavities on its side oriented toward the housing.

10 Claims, 3 Drawing Sheets

Fig.2.2
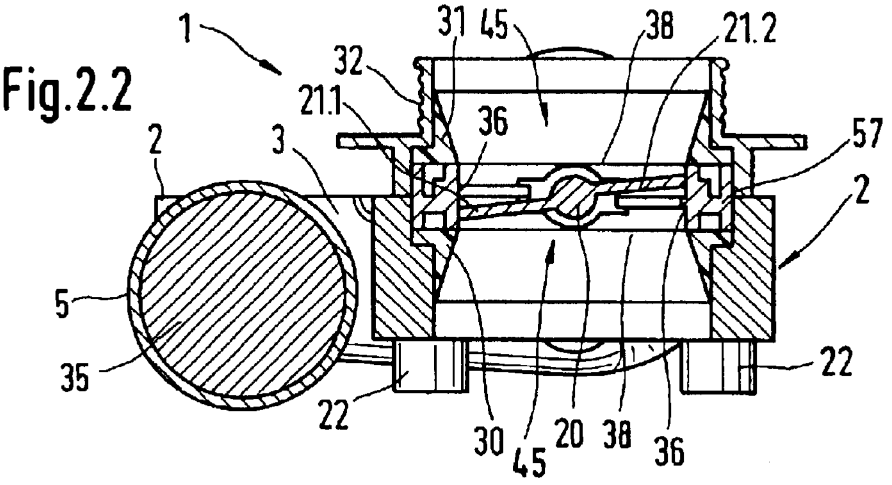
Fig.3
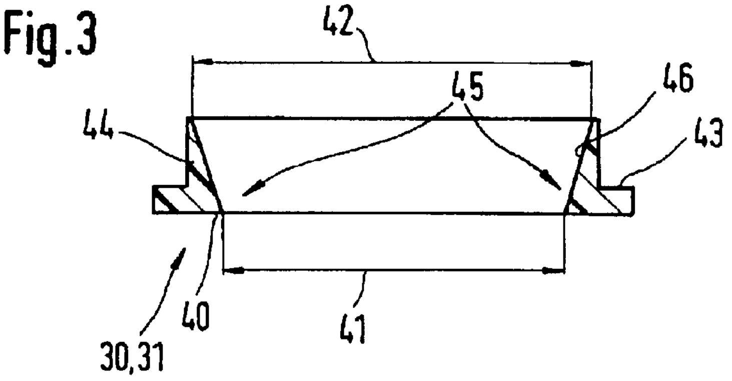
Fig.3.1
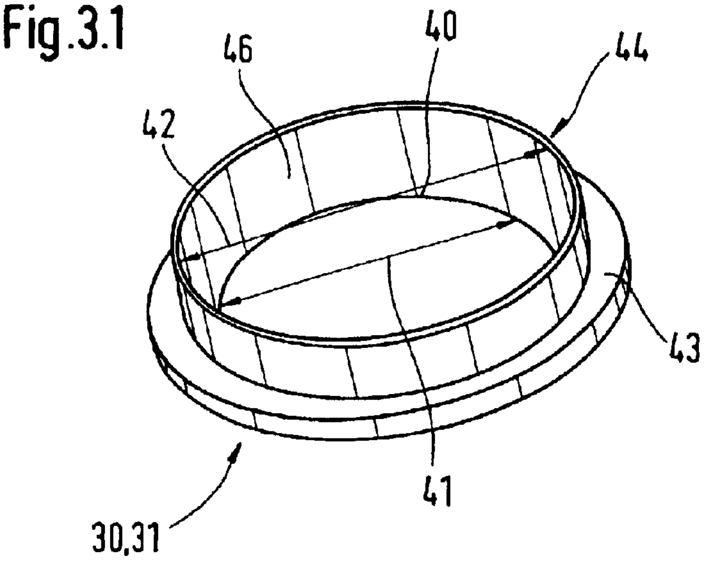

THROTTLE DEVICES HOUSING WITH FLEXIBLE COMPENSATION ELEMENTS FOR INTERNAL COMBUSTION ENGINES

BACKGROUND OF THE INVENTION

1. Field of the Invention

This invention relates to an improved throttle valve assembly for an internal combustion engine in a motor vehicle.

2. Description of the Prior Art

In modern internal combustion engines used in motor vehicles, a throttle device is employed, which as a rule, is produced as a circular butterfly valve, is contained in the intake section of the engine, and meters the volumetric flow of fresh air to be taken in that is required for the combustion. Due to the high flow velocities of the residual air flow in the intake section and at low outside temperatures, the $H_2O$ contained in the fresh air can condense on the wall of the tube; with further cooling, ice can form inside the fresh air line, which can considerably impair the smooth functioning of the throttle valve. Furthermore, in multi-part throttle plate housings, care must be taken that in the region of the dividing joints of the housing halves, no outside air can enter into the intake section downstream of the throttle valve on the side oriented toward the internal combustion engine.

DE 33 46 167 A1 relates to a throttle valve fitting in which a throttle valve is disposed on a shaft, which in turn can be affixed in the fitting housing at both ends by means of slide bearings. These slide bearings are each press-fitted into a shaft bore and have end surfaces oriented toward the throttle valve, which are curved to correspond with a wall of housing bore and constitute a part of this wall. This embodiment of the slide bearings results in an extremely low leakage rate of this throttle valve fitting.

DE 198 43 771 A1 relates to an electromotive actuator, in particular with a throttle valve. This reference discloses an electromotive actuator with a housing and an electric motor, which is disposed on a drive side inside the housing and is for driving a movable element disposed in the housing. In particular, this movable element is a throttle valve and a separate electronic housing for containing control and/or evaluation electronics can be fastened to the housing. On the one hand, this particularly permits electromagnetic interference irradiations to be prevented and on the other hand, mass-produced electronic actuators, which do not require a control unit, can continue to be used without requiring changes in the form for the production of the actuator.

DE 29 49 041 B1 has disclosed a heating system for mixture preparation in mixture producers. According to this embodiment, this is a heating system for mixture preparation in the mixture producers of internal combustion engines, with a tube wall that defines a main flow, a main throttle element downstream, and a fuel metering device in the upstream part of a mixing chamber. Over a part of its longitudinal span, this mixing chamber is embodied as a heat exchanger double wall with an annular hot water chamber, which has a water inlet fitting at its one end and a water outlet fitting at its other end. The heat exchanger can be connected to a cooling water circuit by means of a thermally controlled connecting valve that opens when higher temperatures are reached. The heat exchanger is disposed above the cooling water level when the connecting valve is closed and when the cooling water circuit is switched off. The inner wall of the heat exchanger, which adjoins the main flow path of the mixture producer, is comprised of an electrical heating resistance material and is electrically connected to a voltage source by means of an electrical switching element, which is thermally controlled as a function of the cooling water temperature and opens when a particular higher water temperature is reached.

DE 101 14 221.8-13 has disclosed a heatable throttle device for internal combustion engines. In this device, a fluid flow passes through a flow cross section of a bore, and a fluid flow can be metered by means of an actuatable throttle element that can pivot in a receiving bore in the housing. Between a wall of the bore and the outer circumference of the housing, the housing contains cavities for a heating or cooling medium.

OBJECT AND SUMMARY OF THE INVENTION

The advantages of the present invention can be seen primarily in the fact that now, with a single insert element, which is disposed between the housing halves of a throttle housing comprised of a top shell and a bottom shell, the housing element is, on the one hand, sealed to prevent the intake of external air while on the other hand, the insert element provides a compensation for tolerances in the dividing joints of the two housing halves of the throttle housing, which is embodied, for example, as an injection molded or a diecast aluminum component. This permits finishing procedures, which are usually executed in the course of machining, to be eliminated when assembling the housing halves of the throttle valve housing. The insert element incorporated into the dividing joint of the two housing halves can also seal a heating system integrated into the throttle valve housing. For example, if cavities are integrated into the walls of the throttle valve housing halves, through which a heating medium flows, then the insert element can effectively perform the function of sealing these cavities. In addition, the insert element can compensate for diameter differences in the flow cross section of the throttle valve housing halves so that no abrupt diameter changes and therefore no eddy zones are produced in which mediums contained in the intake air can collect over the operating time of the internal combustion engine.

On the one hand, the insert element can be embodied as a prefabricated shaped part, with a conically extending inner wall; on the other hand, it can also be made of a hardening material so that after assembly, the two throttle valve housing halves are fixed in place for subsequent operation. Both the embodiment of the sealing element as a prefabricated, pre-formed elastomer ring and the embodiment of the sealing element as being made out of a formable material that hardens after being processed permit the compensation of manufacturing inaccuracies on the end surfaces of the upper and lower throttle valve housing halves to be assembled. Up until now, a compensation of manufacturing inaccuracies such as out-of-round errors and balance anomalies was only possible through a complex and expensive finishing of the throttle valve halves to be assembled, usually by means of machining.

The sealing element, which is embodied as an elastomer insert ring or as a hardening molding compound, with a corresponding shaping of the wall of the sealing element oriented toward the flow cross section, and in particular an angled outlet that is formed onto it, can achieve an improved flow guidance in the flow direction of the intake air flow in the intake line of the intake section of an internal combustion engine.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 1.1 shows a partially enlarged sectional depiction of the flow conduits for the temperature control medium;

FIG. 2.1 shows a section through the throttle device according to the cutting line B—B in FIG. 2;

FIG. 2.2 shows a section through the throttle device according to FIG. 2 along the cutting line A—A of FIG. 2;

FIG. 3 shows a section through the sealing element; and

FIG. 3.1 shows a perspective top view of the sealing element according to the depiction in FIG. 3.

DESCRIPTION OF THE PREFERRED EMBODIMENTS

Figure 1:
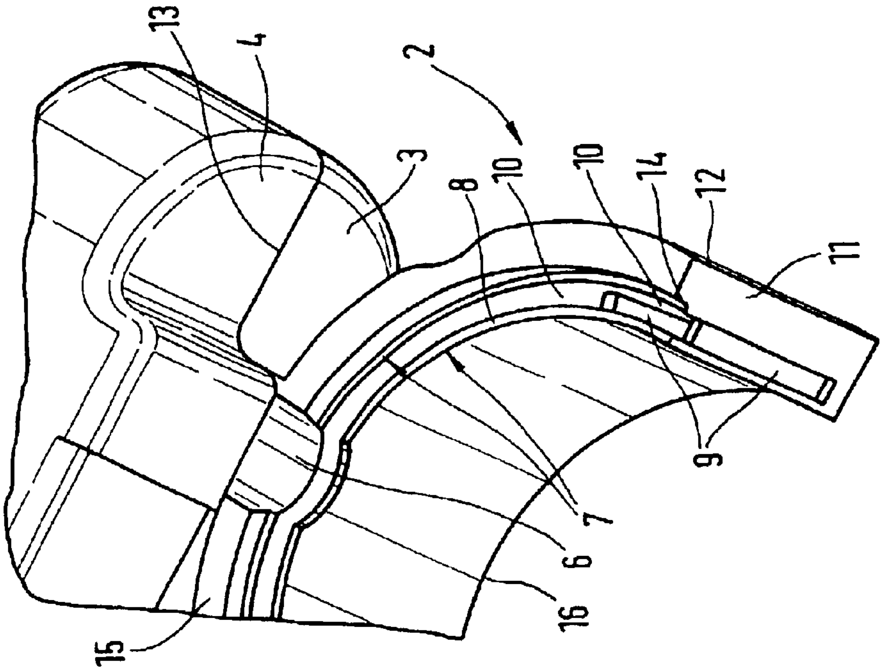
FIG. 1 shows a perspective top view of a throttle valve housing with integrated flow conduits for a temperature control medium.
Figure 1:
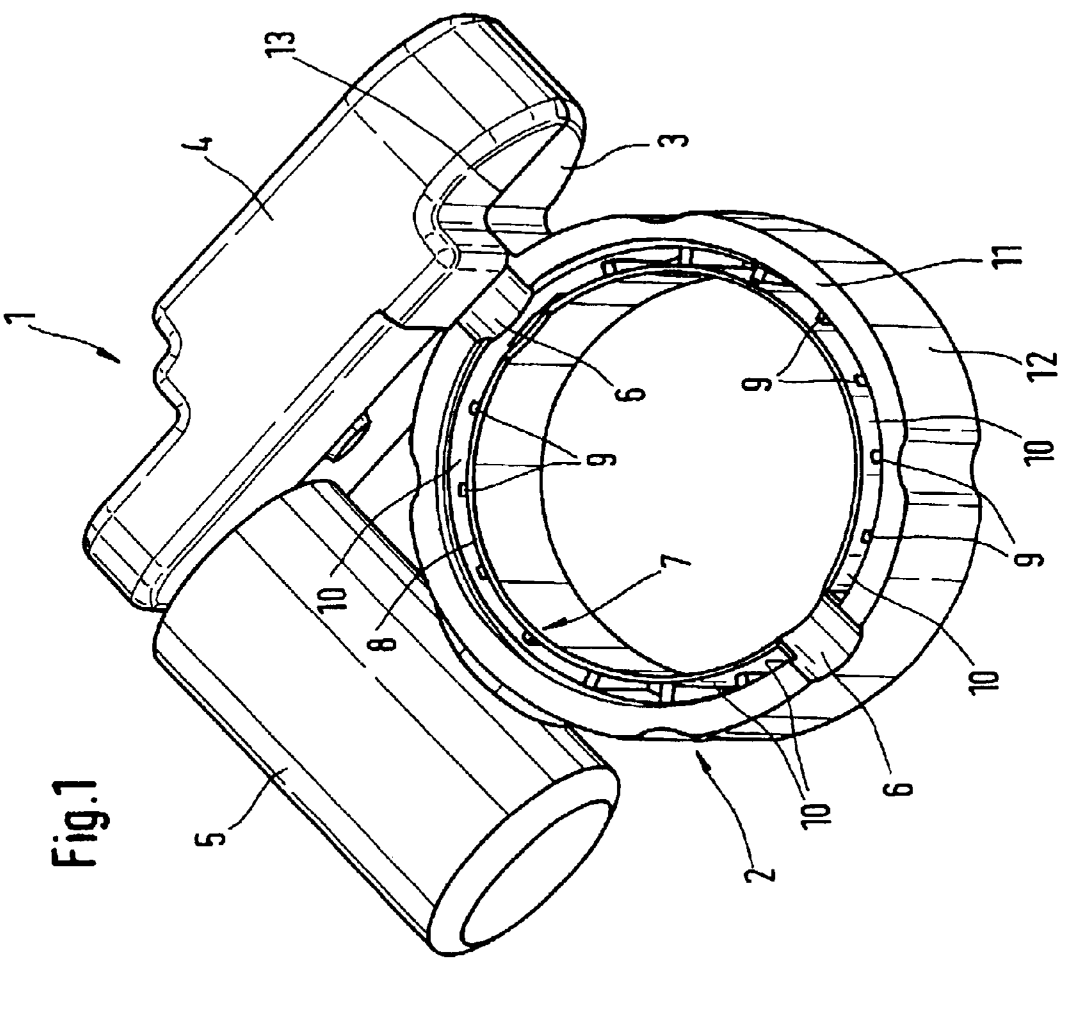

FIG. 1 shows a perspective top view of a throttle valve housing with integrated flow conduits for a temperature control medium. A throttle device 1, whose housing is embodied of multiple parts, includes among other things a lower housing half 2. The lower housing half 2 has a bottom shell 3 injection molded onto it, which is closed by a top shell 4, and drive elements are contained in the cavity defined by the bottom shell 3 and the top shell 4. The drive elements are driven by an actuating drive contained in a drive housing 5 and actuate a throttle valve that is not shown in the depiction in FIG. 1. The throttle valve and the throttle valve shaft are inserted into bearing shells 6 of the other housing half.

The lower housing half 2 includes an inner wall 8, which defines the flow cross section of a fluid flow through the throttle device 1. Rib-shaped bridges 9 extend out from the inner wall 8 in the direction of an outer wall 11 of the lower housing half 2, which outer wall encompasses the inner wall 8. Between the individual rib-shaped bridges 9, cavities 10 are formed, through which a heating medium, e.g. temperature-controlled water or temperature-controlled air, can flow in order to control the temperature of the inner wall 8 defining the flow cross section. On the outer wall 11 that borders the cavities 10, which can be embodied over the entire circumference or in some areas of the circumference of the inner wall 8, an end surface is provided, which supports the other housing half, not shown here, which fixes a throttle valve device 37 (see FIG. 2.1) in the bearing shells 6 of the lower housing half 2. The outer wall 11 on the lower housing half 2 projects up beyond the inner wall 8 of the lower housing half 2, and thus producing a supporting surface 7 for a sealing and compensation element that is not shown in FIG. 1. The outer wall 11 fixes the radial position of a sealing and compensation element that fits with a sleeve-shaped section, which is embodied on it, snugly against the inner wall of the lower housing half 2.

FIG. 1.1 shows a partially sectional depiction of the flow conduits for a temperature control medium inside the lower housing half of the throttle device. The bottom shell 3 of the lower housing half, which contains the drive components, and the top shell 4 that can be placed onto it, rest against each other along a dividing joint 13. The depiction according to FIG. 1.1 shows the cavities 10 that extend in a ring around the inner wall 8, between the inner wall 8 and the outer wall 11, which are each bounded by rib-shaped bridges 9. The inner wall 8, which functions as a supporting surface 7 for a sealing and compensation element that is not shown here, is recessed in relation to the outer wall 11, which protrudes up from it, so that the outer wall 11 serves as a radial contact surface 14 for a sealing and compensation element. The contact surface, i.e. the first end surface 15 of the lower housing half 2, in which the bearing shells 6 are disposed for a throttle valve device not shown here, contacts a corresponding contact surface on an upper housing part of the throttle device 1 that is not shown here. A second end surface 16, which corresponds to the first end surface 15, is embodied on the underside of the lower housing part 2.

Figure 2:
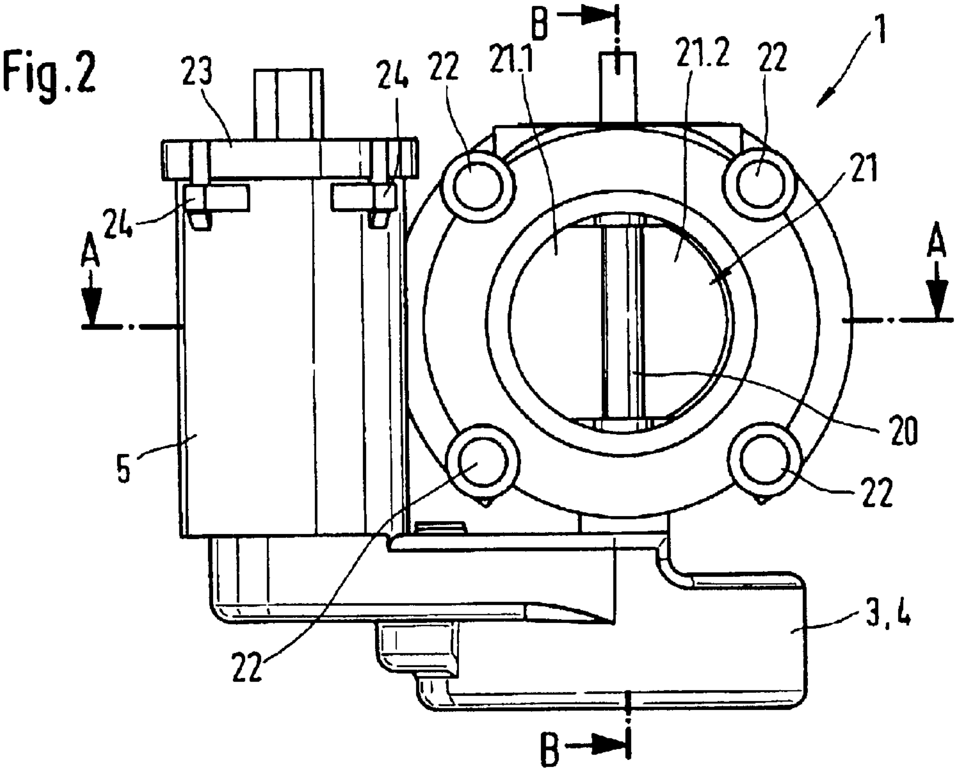
FIG. 2 shows a top view of a throttle device.
Figure 2:
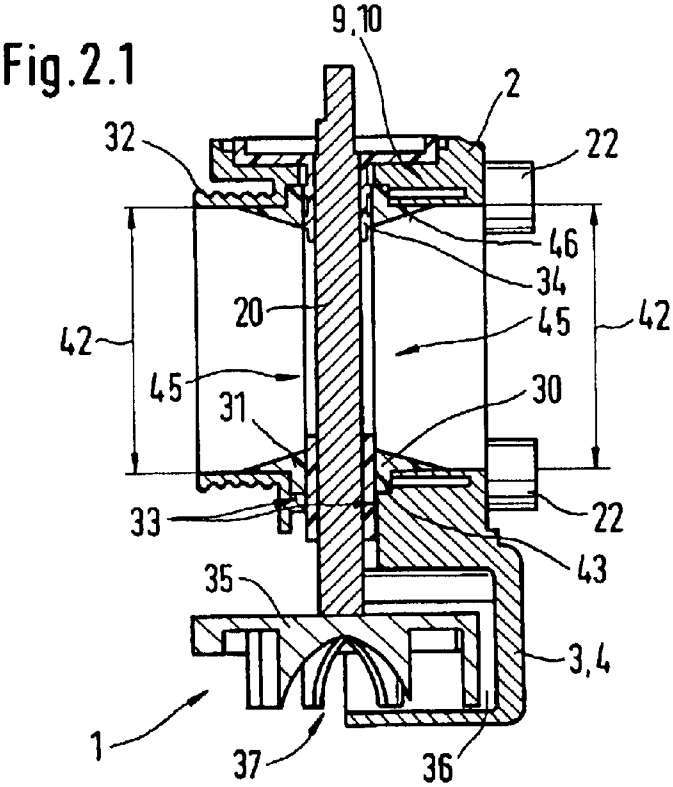

The view in FIG. 2 shows that the lower housing half 2 of a throttle device 1 includes bottom and top shells 3, 4, which contain drive components and are shown here disposed one on top of the other in the plane of the drawing. A drive housing 5 is injection molded onto them, which is closed by a sealing element 23 at the end opposite from the bottom and top shells 3, 4. The sealing element 23 can be fixed, for example by means of snaps 24, to the open end of the drive housing 5 of the lower housing part 2.

The fluid flow passing through the flow cross section of the throttle valve 1 is controlled by a throttle valve surface 21, which opens and closes the free flow cross section. A throttle valve shaft 20 is associated with a first wing 21.1 and a second wing 21.2 of the throttle valve surface 21. The actuating drive, which is contained in the drive housing 5, and drive components, not shown here, which are enclosed by the bottom shell 3 and the top shell 4, rotate the throttle valve shaft 20 in the throttle device 1, and therefore also rotate the first wing 21.1 and second wing 21.2 supported on the throttle valve shaft 20.

The housing components of the throttle device 1 can be connected to each other, for example, by means of socket screws 22, the front of which is shown in the top view according to FIG. 2.

The depiction according to FIG. 2.1 shows that a throttle valve device 37, which includes the throttle valve shaft 20, can be inserted into the throttle device 1 or into its lower housing half 2. The throttle valve device 37, including the throttle valve shaft 20 can, for example, have a drive element 35 injection molded directly onto it, which when the throttle device 1 is assembled, can be adjoined by the bottom shell 3 of the housing bottom part 2 and the top shell 4 that covers it. The throttle valve shaft 20 can, in turn, be enclosed by bearing elements 33, 34, which can be inserted into the bearing shells 6 for the valve shaft 20 shown in FIGS. 1 and 1.1 and in the lower housing half 2, and fixed in place by the mounting of the upper housing half.

When the throttle device 1 according to the depiction in FIG. 2.1 is assembled, a form-fitting section 32 for attaching an air connection hose can be provided on the outside of another housing part of the throttle device 1. The throttle valve shaft 20 of the throttle valve device 37 is encompassed by shaft seals 33, 34 to improve the smooth running in the bearing shells 6 of the lower housing half 2.

A first sealing and compensation element 30 is disposed in the lower housing half 2 of the throttle device 1 in such a way that a contact surface 43 extending in the radial direction seals the cavities 10 in the lower housing half 2. The inner wall 46 of the sealing and compensation element 30 has a conically extending inlet region 45, whose widest cross section 42 is disposed at the end remote from the throttle valve device 37 and whose narrowest cross section 41 corresponds to the diameter of the throttle valve wings 21.1 and 21.2 supported on the throttle valve shaft 20. In lieu of a first sealing and compensation element 30 shown in FIG. 2.1, which can be inserted into the lower housing half 2 and is embodied as an elastomer shaped part, this sealing and compensation element can also be comprised of a formable, hardenable material, whose final shaping occurs when the other housing half is mounted onto the lower housing half 2. The sealing and compensation element 30, which is either embodied as a formable, hardenable material or as a separate elastomer shaped part, can be used to compensate for manufacturing inaccuracies that occur in the vicinity of the contact surfaces in aluminum diecast throttle device housing components, without requiring finishing since manufacturing inaccuracies are compensated by the radially extending contact surface 43 oriented toward the throttle valve device 37.

In addition to the first sealing and compensation element 30 in the lower housing half 2 of the throttle device 1, an additional sealing and compensation element 31 can be inserted, which corresponds to the first sealing and compensation element 30. The two sealing and compensation elements 30, 31, which rest against the shaft seals 33 and 34 of the throttle valve shaft 20 in the sectional depiction according to FIG. 2.1, seal the lower housing half 2 and the additional housing half along their end surfaces, which are not shown in FIG. 2.1. In the additional sealing and compensation element 31 as well, the contour of the inner wall 46 forms a conical inlet funnel 45 that extends out, starting from the widest cross section 42.

FIG. 2.2 shows a section through the throttle device according to FIG. 2 along the cutting line A—A. The lower housing half 2 has a drive housing 5 embodied on it, which contains a drive unit shown here as a sectional representation of solid material. The drive unit acts on the drive components 35, which are enclosed by the bottom shell 3 and top shell 4 and which actuate the throttle valve shaft 20 of the throttle valve device 37 inside the flow cross section through which the fluid flow passes.

The throttle valve device 37, which includes the throttle valve shaft 20 and the first wing 21.1 and second wing 21.2 that are supported exactly opposite each other or offset from each other on this shaft, can be produced e.g. as an insert component 37, which forms butt joints 38 with the first sealing and compensation element 30 and the additional sealing and compensation element 31 that are likewise fitted into the flow cross section of the fluid flow. In the vicinity of the narrowest cross section, shoulders 36 can be embodied on the throttle valve device embodied as an insert component 37. However, it is not absolutely necessary to embody shoulders 36 on the throttle valve device embodied as an insert component 37. By means of the narrowest cross section, which is embodied on the first and the additional sealing and compensation element 30, 31, the flow cross section in the fluid conduit of the throttle device 1 can be adapted to different throttle valve diameters. Consequently, the embodiment according to the invention allows a wide variety of throttle valve device is 37 to be installed in one and the same housing; the sealing and compensation elements 30 and 31 sectionally depicted in FIG. 2.2 serve as elements for reducing the flow cross section. In addition to the function as a reducing element, the sealing and compensation elements 30, 31 according to the depiction in FIG. 2.1 can close cavities 10, which are embodied in a housing half 2 and through which a temperature control medium flows; in addition, the contact surface 43 extending in the radial direction serves as a compensating surface to compensate for manufacturing inaccuracies in throttle valve housing components produced using aluminum diecasting.

The components functioning in FIG. 2.2 as sealing and compensation elements 30 and 31, in addition to being embodied as a separate elastomer insert rings, can also be comprised of formable, hardenable materials, whose final shaping occurs during assembly of the housing halves of the throttle device 1 and which, in the assembled state, fix the insert component 37 of the throttle valve element in place and seal the dividing joint of the housing halves against the entry of outside air.

FIG. 3 shows that the insert part 30, 31 embodied as a separate component made of flexible elastomer material has a narrowest cross section 41 and a widest cross section 42. The cross sectional difference forms an inlet funnel, i.e. a conical, truncated cone-shaped inlet region 45, which is provided with an angled throat 40 at the narrowest cross section 41. Viewed in terms of the flow direction of the fluid flow passing through the throttle device 1, a homogeneous flow profile is imparted to this fluid flow when it passes through the angled throat 40 disposed at the narrowest cross section 41. The sealing and compensation element 30, 31 shown in a sectional view in FIG. 3 has a contact surface 43 extending in the radial direction and a constant diameter sleeve-shaped section 44 formed onto it. The sealing and compensation element 30, 31 rests with the sleeve-shaped section 44 against the inner wall 8 of the throttle device 1. One side of the radially extending contact surface 43 (see FIG. 2.1), closes cavities 10 that serve to control the temperature of the housing of the throttle device 1, while the other side of the radially extending contact surface 43 performs a compensating function with regard to manufacturing inaccuracies in the other housing half to be joined to the bottom housing half 2, without requiring machine finishing of housing components produced using aluminum diecasting.

FIG. 3.1 shows a perspective top view of the sealing and compensation element according to the sectional depiction in FIG. 3. Depending on the diameter difference between the narrowest cross section 41 and the widest cross section 42, a conically extending inlet funnel is produced on the inner wall 46 in relation to the narrowest cross section 41 of the sealing and compensation element 30, 31. The inner wall 46 extends in an essentially smooth manner so that a homogeneous flow profile over the cross section can be imparted to the fluid flow emerging from the narrowest cross section 41 of the sealing and compensation element 30, 31, thus avoiding the production of turbulence and eddy zones. Through the selection of the narrowest cross section 41, the proposed sealing and compensation element 30, 31, which can either be produced as a discrete elastomer shaped part or can be made of a formable, hardenable material, can also be used as a reducing element so that a component being used, for example, as a standard housing type for a throttle device 1 can have a throttle valve device 37 built into it, whose throttle valve surface diameter is smaller than the free flow cross section. The inlet funnel 45 comprised of the first and additional sealing and compensation element 30, 31 can accelerate the flow in the vicinity of the narrowest cross section, i.e. where the throttle valve device produced as an insert component 37 is disposed in the free flow cross section of the throttle device 1.

The foregoing relates to preferred exemplary embodiments of the invention, it being understood that other variants and embodiments thereof are possible within the spirit and scope of the invention, the latter being defined by the appended claims.

We claim:

1. A throttle device for controlling a fluid flow in a fluid flow conduit of an internal combustion engine, comprising a multi-part housing including a first housing part (2) and an additional housing half joined to each other at contact surfaces (15), a flat valve element (21) in the fluid flow conduit an actuating drive for adjusting the flat valve in the fluid flow conduit for controlling the fluid flow therein, and at least one sealing and compensation element (30, 31), the contour (45) of which defines the flow cross section of the fluid flow and which has a contact surface (43) which can seal cavities (10) on its side oriented toward the housing.

2. The throttle device according to claim 1, wherein the sealing and compensation element (30, 31) is embodied as an insertable elastomer shaped part.

3. The throttle device according to claim 1, wherein the sealing and compensation element (30, 31) is made of a formable, hardenable material, which is introduced between contact surfaces (15) of the multi-part housing of the throttle device (1) during final assembly.

4. The throttle device according to claim 1, wherein the at least one housing part (2) of the multi-part housing is divided by rib-shaped bridges (9) into cavities (10) in which a temperature control medium flows for controlling the temperature of an inner wall (8) of the housing part (2).

5. The throttle device according to claim 4, further comprising a supporting surface (7) for containing a sealing and compensation element (30, 31) on one of the end surfaces (15, 16) of the cavities (10) of the housing part (2).

6. The throttle device according to claim 2, wherein the sealing and compensation element (30, 31) has a sleeve section (44) embodied on it and/or has a contact surface (43) embodied on it that extends in the radial direction of the sealing and compensation element (30, 31).

7. The throttle device according to claim 2, wherein in the vicinity of the narrowest cross section (41), an angled throat (40) is formed onto the sealing and compensation element (30, 31).

8. The throttle device according to claim 2, wherein an inner wall (46) of the sealing and compensation element (30, 31) extends from the widest cross section (42) to the narrowest cross section (41) in a form that corresponds to the lateral surface (45) of a truncated cone.

9. The throttle device according to claim 2, wherein depending on the narrowest cross section (41) on the sealing and compensation element (30, 31), the flow cross section of the throttle device (1) can be adapted so that throttle valve devices (37) of different diameters can be integrated into a given housing type.

10. The throttle device according to claim 6, wherein with one side of the contact surface (43), the sealing and compensation element (30, 31) seals cavities (40) in a double wall (8, 11) of the housing part (2) and with the other side, rests against a contact surface of another housing part of a multi-part housing, which corresponds to the contact surface (15) of the housing part (2).

* * * * *